(12) United States Patent
Zhang

(10) Patent No.: US 12,198,301 B2
(45) Date of Patent: Jan. 14, 2025

(54) IMAGE FUSION METHOD AND APPARATUS, STORAGE MEDIUM, AND ELECTRONIC DEVICE

(71) Applicant: ZHEJIANG UNIVIEW TECHNOLOGIES CO., LTD., Hangzhou (CN)

(72) Inventor: Yanan Zhang, Hangzhou (CN)

(73) Assignee: ZHEJIANG UNIVIEW TECHNOLOGIES CO., LTD., Hangzhou (CN)

(*) Notice: Subject to any disclaimer, the term of this patent is extended or adjusted under 35 U.S.C. 154(b) by 358 days.

(21) Appl. No.: 17/770,605

(22) PCT Filed: Apr. 27, 2020

(86) PCT No.: PCT/CN2020/087260
§ 371 (c)(1),
(2) Date: Apr. 20, 2022

(87) PCT Pub. No.: WO2021/077706
PCT Pub. Date: Apr. 29, 2021

(65) Prior Publication Data
US 2022/0292658 A1 Sep. 15, 2022

(30) Foreign Application Priority Data
Oct. 21, 2019 (CN) .......................... 201911000100.3

(51) Int. Cl.
G06K 9/00 (2022.01)
G06T 5/50 (2006.01)
(Continued)

(52) U.S. Cl.
CPC ................. *G06T 5/50* (2013.01); *G06T 5/70* (2024.01); *G06T 5/94* (2024.01); *G06T 7/74* (2017.01);
(Continued)

(58) Field of Classification Search
CPC .... G06T 5/50; G06T 5/70; G06T 5/94; G06T 7/74; G06T 2207/10024;
(Continued)

(56) References Cited

U.S. PATENT DOCUMENTS

| 9,398,235 B2 | 7/2016 | Bae et al. |
| 2014/0168444 A1 | 6/2014 | Bae et al. |

(Continued)

FOREIGN PATENT DOCUMENTS

| CN | 104079908 | 10/2014 |
| CN | 105069768 | 11/2015 |

(Continued)

OTHER PUBLICATIONS

Extended European Search Report dated Oct. 24, 2023 in EP Patent Application No. 20879013.9, pp. 1-13.
(Continued)

*Primary Examiner* — Xin Jia
(74) *Attorney, Agent, or Firm* — Byrne Poh LLP

(57) ABSTRACT

Provided are an image fusion method, a storage medium and an electronic device are to-be-fused are acquired. Luminance and chrominance separation is performed on the visible light image to extract a luminance component and a chrominance component. Luminance fusion is performed on the luminance component of the visible light image and the infrared image to obtain a luminance fusion result. Image reconstruction is performed according to the luminance fusion result and the chrominance component of the visible light image to obtain a fused image.

17 Claims, 3 Drawing Sheets

(51) Int. Cl.
  *G06T 5/70* (2024.01)
  *G06T 5/94* (2024.01)
  *G06T 7/73* (2017.01)
  *H04N 9/78* (2006.01)
(52) U.S. Cl.
  CPC ..... *H04N 9/78* (2013.01); *G06T 2207/10024* (2013.01); *G06T 2207/10048* (2013.01); *G06T 2207/20192* (2013.01); *G06T 2207/20221* (2013.01)
(58) Field of Classification Search
  CPC . G06T 2207/10048; G06T 2207/20192; G06T 2207/20221; G06T 2207/20016; G06T 2207/20032; G06T 2207/20064; G06T 2207/10052; H04N 9/78
  See application file for complete search history.

(56) References Cited

U.S. PATENT DOCUMENTS

| | | | |
|---|---|---|---|
| 2018/0330473 A1 | 11/2018 | Foi et al. | |
| 2019/0318463 A1 | 10/2019 | Zhang et al. | |

FOREIGN PATENT DOCUMENTS

| | | | | | |
|---|---|---|---|---|---|
| CN | 106023129 A | * | 10/2016 | ........... | G06T 3/0068 |
| CN | 106548467 | | 3/2017 | | |
| CN | 106600572 | | 4/2017 | | |
| CN | 106952245 | | 7/2017 | | |
| CN | 107945149 A | * | 4/2018 | ............... | G06T 5/50 |
| CN | 108780569 A | | 11/2018 | | |
| CN | 110136183 | | 8/2019 | | |
| CN | 110175970 | | 8/2019 | | |
| CN | 110246108 | | 9/2019 | | |

OTHER PUBLICATIONS

Office Action dated Nov. 21, 2023 in CN Patent Application No. 201911000100.3, pp. 1-16.

Sharma, A.M. et al, "Image Fusion: Spatial-domain Filtering Techniques Dictate Low-light Visible and IR Image-fusion Performance", Laser Focus World, last accessed Oct. 11, 2023, pp. 1-9, available at: https://www.laserfocusworld.com/software-accessories/software/article/16556302/image-fusion-spatial-domain-filtering-techniques-dictate-low-light-visible-and-ir-image-fusion-performance.

Yadav, S., et al., "Modified Layer Based Infrared and Noisy Image Fusion", in 2017 4th International Conference on Signal Processing and Integrated Networks (SPIN), Noida, IN, Feb. 2-3, 2017, pp. 618-623.

Search Report dated Jul. 14, 2022 in International Patent Application No. 2020/087260, pp. 1-4.

* cited by examiner

IMAGE FUSION METHOD AND APPARATUS, STORAGE MEDIUM, AND ELECTRONIC DEVICE

CROSS-REFERENCE TO RELATED APPLICATIONS

This is a National Stage Application filed under 35 U.S.C. 371 based on International Patent Application No. PCT/CN2020/087260, filed on Apr. 27, 2020, which claims priority to Chinese Patent Application No. 201911000100.3, filed on Oct. 21, 2019, disclosures of both of which are incorporated herein by reference in their entireties.

TECHNICAL FIELD

The present application relates to the field of image processing technologies, for example, an image fusion method, a storage medium and an electronic device.

BACKGROUND

Image fusion refers to that image data about the same target is collected by multi-source channels, favorable information in each channel is extracted to the maximum extent through image processing and computer technologies, and a high-quality image is finally synthesized. In this way, the utilization rate of image information is enhanced, the accuracy and reliability of computer interpretation are improved, and the spatial resolution and spectral resolution of the original image are improved, which are conducive to monitoring.

Most of image fusion techniques in the related art are simple fusion of source images, and the inconsistency of the source images in the luminance or the structure is rarely considered, resulting in color distortion, edge blurring or obvious noise of the fused image.

SUMMARY

Embodiments of the present application provide an image fusion method and apparatus, a storage medium and an electronic device, through which luminance fusion is performed on the luminance component of a visible light image and an infrared image to improve the signal-to-noise ratio and the contrast of an image obtained after fusion, and edge information is better retained.

The embodiments of the present application provide an image fusion method. The method includes steps described below.

A visible light image and an infrared image which are to-be-fused are acquired.

Luminance and chrominance separation is performed on the visible light image to extract a luminance component and a chrominance component.

Luminance fusion is performed on the luminance component of the visible light image and the infrared image to obtain a luminance fusion result.

Image reconstruction is performed according to the luminance fusion result and the chrominance component of the visible light image to obtain a fused image.

The embodiments of the present application provide an image fusion apparatus. The apparatus includes an image acquisition module, a luminance and chrominance separation module, a luminance fusion module and a luminance and chrominance reconstruction module.

The image acquisition module is configured to acquire a visible light image and an infrared image which are to-be-fused.

The luminance and chrominance separation module is configured to perform luminance and chrominance separation on the visible light image to extract a luminance component and a chrominance component.

The luminance fusion module is configured to perform luminance fusion on the luminance component of the visible light image and the infrared image to obtain a luminance fusion result.

The luminance and chrominance reconstruction module is configured to perform image reconstruction according to the luminance fusion result and the chrominance component of the visible light image to obtain a fused image.

The embodiments of the present application provide a computer-readable storage medium which is configured to store a computer program which, when executed by a processor, implements the image fusion method of the embodiments of the present application.

The embodiments of the present application provide an electronic device including a memory, a processor and a computer program stored in the memory and executable on the processor, where the processor, when executing the computer program, implements the image fusion method of the embodiments of the present application.

DETAILED DESCRIPTION

Figure 1:
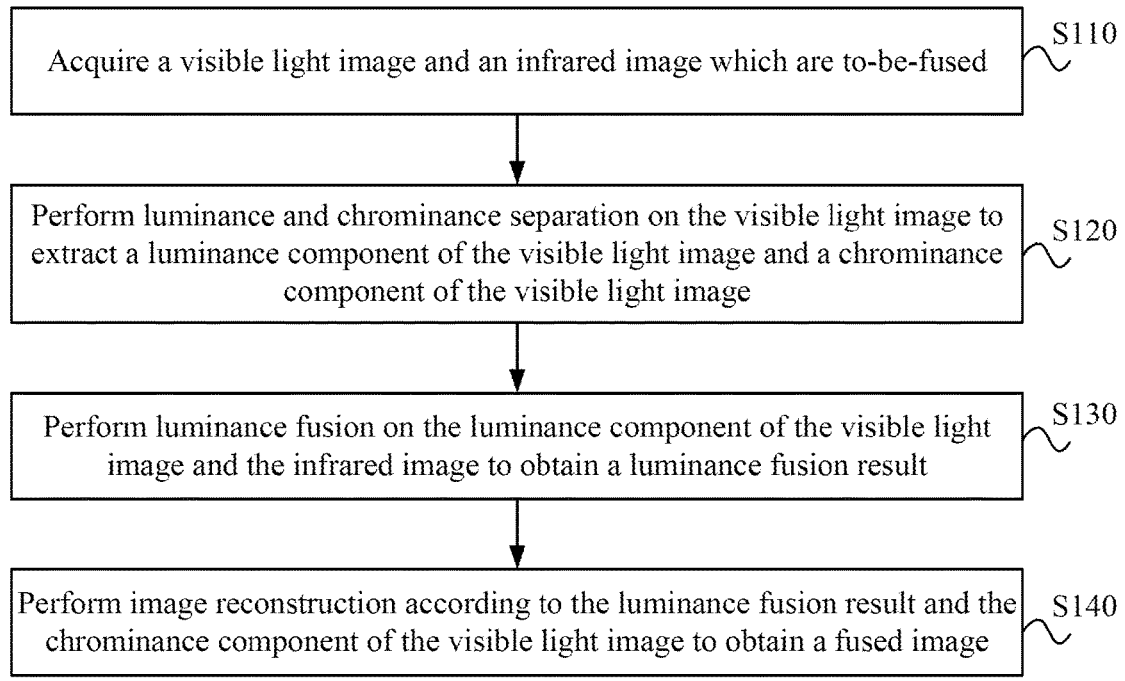
FIG. 1 is a flowchart of an image fusion method according to an embodiment of the present application.

The present application is described hereinafter in conjunction with drawings and embodiments. The embodiments described herein are intended to explain and not to limit the present application. In addition, for ease of description, only part, not all, of structures related to the present application are illustrated in the drawings.

Before the exemplary embodiments are discussed, it is to be noted that some of the exemplary embodiments are described as processing or methods depicted in flowcharts. Although the flowcharts describe multiple steps as sequentially processed, many of the steps may be implemented concurrently, coincidently or simultaneously. Additionally, the sequence of the multiple steps may be rearranged. The processing may be terminated when operations are completed, but the processing may further have additional steps which are not included in the drawings. The processing may correspond to a method, a function, a procedure, a subroutine, a subprogram, etc.

FIG. 1 is a flowchart of an image fusion method according to an embodiment of the present application. The embodiment may be applied to the case of fusing a visible light image and an infrared image. The method may be executed by an image fusion apparatus provided by an embodiment of the present application. The apparatus may be implemented by means of software and/or hardware and may be integrated in an electronic device such as an intelligent terminal.

As shown in FIG. 1, the image fusion method includes steps described below.

In S110, a visible light image and an infrared image which are to-be-fused are acquired.

In an embodiment, the visible light image and the infrared image which are to-be-fused may be images acquired for the same target. For example, the visible light image and the infrared image of the target are acquired by activating a visible light camera and an infrared camera simultaneously and respectively. The infrared image and the visible light image may be acquired by supplementing the target with light. For example, in the case of acquiring the infrared image, an infrared illuminator is adopted to supplement the target with light. The visible light image may also be an image obtained by supplementary lighting.

In S120, luminance and chrominance separation is performed on the visible light image to extract a luminance component and a chrominance component.

In an embodiment, the luminance and chrominance separation mainly refers to separating the luminance component and the chrominance component of the visible light image. For example, the original format of the visible light image is YCrCb (YUV), and a Y component of the YUV image may be extracted as the luminance component of the visible light image and a UV component as the chrominance component of the visible light image. Alternatively, the original format of the visible light image is Hue, Saturation, Value (HSV), and a V component of the HSV image may be extracted as the luminance component of the visible light image and a HS component as the chrominance component of the visible light image. In an embodiment, if the original format of the visible light image is Red, Green, Blue (RGB), the RGB image may be converted to an image of the YUV, HSV or other custom color spaces for the separation of the luminance component and the chrominance component.

In S130, luminance fusion is performed on the luminance component of the visible light image and the infrared image to obtain a luminance fusion result.

In an embodiment, after the luminance and chrominance separation is performed on the visible light image, the luminance fusion is performed on the luminance component of the visible light image and the infrared image to obtain the luminance fusion result. In this way, the fused luminance component not only has the relatively high signal-to-noise ratio and contrast, but also keeps more edge details.

In an embodiment, the step in which the luminance fusion is performed on the luminance component of the visible light image and the infrared image to obtain the luminance fusion result includes steps described below. The infrared image is corrected according to the luminance component of the visible light image to obtain a corrected infrared image. Image layer decomposition is performed on the luminance component of the visible light image and the corrected infrared image, respectively, and corresponding fusion is performed on multiple layers of the luminance component of the visible light image obtained after the image layer decomposition and on multiple layers of the corrected infrared image obtained after the image layer decomposition. Results of multiple-layer corresponding fusion are superimposed to obtain the luminance fusion result.

In an embodiment, the infrared image is corrected according to the luminance component of the visible light image to obtain the corrected infrared image. The luminance information of the infrared image is corrected mainly according to the luminance information of the visible light image to eliminate the inconsistency between the visible light image and the infrared image in the luminance and/or the structure, thereby avoiding problems of color distortion, detail loss and pseudo-edge caused by direct fusion. In an embodiment, several correction manners described below are included.

The first manner only considers the inconsistency in the luminance. For example, in a low-illuminance scene at night, the luminance of a visible light image is relatively low, while the luminance of an infrared image is relatively high due to infrared supplementary lighting, but luminance overexposure exits in areas such as the number plate. Therefore, direct fusion may lead to color distortion and other problems, and luminance correction for the infrared image is considered. In an embodiment, a global mapping manner may be used to perform luminance correction on the infrared image. For example, a histogram matching method may be adopted, and the luminance histogram of the visible light image is taken as a matching histogram to correct the infrared luminance; and the average value of the luminance of the visible light image may also be counted, and then linear mapping is performed on the infrared luminance. In addition to the global mapping correction, the infrared luminance may also be locally corrected according to information such as the local luminance or contrast of the luminance component of the visible light.

The second manner only considers the inconsistency in the structure. In addition to the inconsistency in the luminance, the inconsistency in the structure also exists between the visible light image and the infrared image due to the difference in reflection characteristics. For example, the information of the number plate in the infrared image is lost. Correction in the structure of the infrared luminance may avoid detail loss of this region due to fusion. Here, a joint filtering algorithm, such as guided filtering, weighted least squares (WLS) filtering or joint bilateral filtering, may be used to perform correction, a filtering operation is performed on the infrared image by taking edge information of the visible light image as reference, and the filtered infrared luminance image has the same edge details as the visible light image. Non-filtering methods such as soft matting may also be used to eliminate the inconsistency in the edge structure.

In the embodiment, the infrared luminance, the infrared luminance image and the infrared image have the same meaning.

It can be seen that the above two manners may be respectively used to correct the infrared image, or the above two manners may be simultaneously used to correct the infrared image, so as to achieve the fusion effect of restraining the pseudo-edge structure, real color and complete details. The above is the process of infrared image correction. After the correction is completed, the image layer decomposition is performed on the luminance component of the visible light image and the corrected infrared image, respectively, and the corresponding fusion is performed on the multiple layers of the luminance component of the visible light image obtained after the image layer decomposition and on the multiple layers of the corrected infrared image obtained after the image layer decomposition. The results of the multiple-layer corresponding fusion are superimposed to obtain the luminance fusion result. Through the correction of the infrared image, the color distortion after direct fusion caused by the overexposure of the infrared image and the structure difference can be avoided.

Based on the above technical solution, optionally, the step in which the infrared image is corrected according to the luminance component of the visible light image to obtain the corrected infrared image includes steps described below. A position of a reference pixel of the luminance component of the visible light image is determined according to a position of each pixel in the infrared image. A luminance correction result of each pixel is determined according to a preset-range neighborhood block with the position of the reference pixel as a center and a preset-range neighborhood block with the position of each pixel as a center. All pixels of the infrared image are traversed to obtain the corrected infrared image.

Based on the above technical solution, optionally, the step in which the luminance correction result of each pixel is determined according to the preset-range neighborhood block with the position of the reference pixel as the center and the preset-range neighborhood block with the position of each pixel as the center includes that the luminance correction result of each pixel is determined by adopting the following formula:

$$Y_{ir}'(i)=Y_{vis}(i)\alpha_i(1)+\alpha_i(2)$$

$Y_{ir}'(i)$ represents the luminance correction result of each pixel, $Y_{vis}(i)$ represents a luminance value of the reference pixel, and $\alpha_i(1)$ and $\alpha_i(2)$ represent a first numerical value and a second numerical value of a matrix $\alpha_i$.

$$\alpha_i=(Q_i^TW_iQ_i+\lambda I)^{-1}(Q_i^TW_ip_i+\lambda\alpha_i^0); \alpha_i\Pi R^{2\times 1};$$

$\lambda$ represents a preset regularization parameter, $W_i$ represents a preset weight matrix, and $Q_i$ represents a matrix formed by luminance values of multiple pixels within the preset-range neighborhood block with the position of each pixel as the center and a numerical value 1; $Q_i^T$ represents a transposed matrix of $Q_i$; $p_i$ represents a matrix formed by luminance values of pixels within the preset-range neighborhood block with the position of the reference pixel as the center; I represents an identity matrix; $\alpha_i^0$ represents a local contrast factor formed by a ratio of a luminance value of each pixel to an average value of the luminance values of the multiple pixels within the preset-range neighborhood block with the position of each pixel as the center; and $R^{2\times 1}$ represents a linear space formed by all 2×1 matrices over a real number field R.

In an embodiment, the third manner for infrared image correction may be used for illustration.

The third manner considers the inconsistency in the luminance and the structure simultaneously. An embodiment is given here, and implementation steps are described below.

For any pixel i in the infrared luminance image, the conversion formula is as follows:

$$\min_\alpha \left\| W_i^{1/2}(p_i - Q_i\alpha_i) \right\|_2^2 + \lambda \left\| \alpha_i - \alpha_i^0 \right\|_2^2.$$

$p_i=R_iY_{vis}$, $R_i\Pi R^{m^2\times N}$, $p_i\Pi R^{m^2\times 1}$, $p_i$ represents a vector composed of luminance values of pixels in the neighborhood block with the pixel i as the center in the visible light luminance image $Y_{vis}$, $R_i$ represents a linear transformation, and N represents the dimension of $Y_{vis}$. The range of the neighborhood block is m*m, and the value of m may be 3, 5, etc., and the range of the neighborhood block may also be a larger range with the pixel i as the center.

$Q_i=[R_iY_{ir}^0 1], Q_i\Pi R^{m^2\times 2}$, $Q_i$ represents a matrix composed of luminance values of pixels in the neighborhood block with the pixel i as the center in an original infrared luminance image $Y_{ir}^0$ and column vectors with all elements of 1.

$W_i\Pi R^{1\times m^2}$ and $W_i$ represents a preset weight matrix. The weight is determined by the distance between a pixel in a neighborhood block and the pixel i, and the larger the distance, the smaller the weight.

$\alpha_i^0=[R_iY_{ir}^0(i)/\text{avg}(R_iY_{ir}^0)0]$, $\alpha_i^0\Pi R^{2\times 1}$, and $\alpha_1^0$ represents a vector composed of a local contrast factor and 0.

$\lambda$ represents a preset regularization parameter. The smaller the value, the closer the corrected infrared luminance image to the visible light image, and the lower the degree of inconsistency. The larger the value of $\lambda$, the closer the corrected infrared luminance image to the original infrared luminance image, and the higher the signal-to-noise ratio and the contrast. The value of $\lambda$ may be adjusted according to real scenes. The above optimal formula has an analytical solution in the following form:

$$\alpha_i=(Q_i^TW_iQ_i+\lambda I)_{-1}(Q_i^TW_ip_i+\lambda\alpha_i^0)\alpha_i\Pi R^{2\times 1}.$$

A matrix $\alpha_i$ of two rows and one column can be obtained, and the luminance of the pixel i of the corrected infrared image $Y_{ir}$ is calculated as below:

$$Y_{ir}(i)=Y_{vis}(i)\alpha_i(1)+\alpha_i(2).$$

$\alpha_i(1)$ represents the numerical value of the first row of the matrix $\alpha_i$, $\alpha_i(2)$ represents the numerical value of the second row of the matrix $\alpha_i$, $Y_{ir}(i)$ represents the luminance of the pixel i of the corrected infrared image $Y_{ir}$, and $Y_{vis}(i)$ represents the luminance of the pixel i of the visible light image $Y_{vis}$.

All pixels of the whole infrared image are traversed, the above calculation steps are repeated, and then the corrected infrared image can be obtained.

In the embodiment, optionally, the step in which the image layer decomposition is performed on the luminance component of the visible light image and the corrected infrared image, respectively, and the corresponding fusion is performed on the multiple layers of the luminance component of the visible light image obtained after the image layer decomposition and on the multiple layers of the corrected infrared image obtained after the image layer decomposition includes steps described below. The luminance component of the visible light image is layered into a visible light luminance base layer and a visible light luminance detail layer, and the corrected infrared image is layered into an infrared image base layer and an infrared image detail layer. The visible light luminance base layer and the infrared image base layer are fused, and the visible light luminance detail layer and the infrared image detail layer are fused. In an embodiment, two layers or more layers may be obtained by image layer decomposition, and each layer is fused. Here, that a base layer and a detail layer being obtained by image layer decomposition is taken for illustration. In the embodiment, the base layer and the detail layer of the visible light luminance image and the base layer and the detail layer of the corrected infrared luminance image are mainly obtained by image layer decomposition. For example, multiscale decomposition methods, such as a wavelet transform, a Gaussian pyramid, a Laplacian pyramid and the like, may be used, and filtering algorithms may also be used to achieve the image layer decomposition of the luminance. A linear filtering algorithm, such as mean filtering, Gaussian filtering and the like, may be used. This filtering method has the advantages of simple principles, low computation complexity and excellent performance, and can quickly achieve the smooth of the luminance image. The non-linear filtering algorithm, such as median filtering, non-local mean filtering and bilateral filtering and other edge preserving filtering algorithms, may also be used. This filtering method can protect the edge information of the image while removing small noise or texture details, but has relatively high complexity. The visible light luminance image $Y_{vis}$ being layered by mean filtering is taken as an example, and implementation steps are described below.

Mean filtering is performed on the visible light luminance image $Y_{vis}$:

$$Y_{vis\_base}(i) = \sum_{j \in \Omega_i} w * Y_{vis}(i). \quad (i)$$

w represents a mean filtering template, $\Omega_i$ represents a mean filtering window with the pixel i as the center, * represents a convolution operation, and $Y_{vis_{base}}(i)$ represents the luminance of the pixel i of the visible light luminance base layer base $Y_{vis\_base}$.

At this time, the visible light luminance detail layer may be obtained through the following formula:

$$Y_{vis\_det}(i) = Y_{vis}(i) - Y_{vis\_base}(i).$$

$Y_{vis\_det}(i)$ represents the luminance of the pixel i of the visible light luminance detail layer $Y_{vis\_det}$, and $Y_{vis}(i)$ represents the luminance of the pixel i of the visible light image $Y_{vis}$. Correspondingly, a luminance decomposition operation may also be performed on the corrected infrared image by the above method.

Through this decomposition manner, each layer is fused, thus the fusion effect of the image can be improved, and a more accurate image can be obtained.

In an embodiment, the step in which the visible light luminance base layer and the infrared image base layer are fused includes steps described below. A region saliency matrix of the visible light luminance base layer and a region saliency matrix of the infrared image base layer are determined through high-pass filtering, and a first weight $B_{vis}^1$ of the visible light luminance base layer and a first weight $B_{ir}^1$ of the infrared image base layer are determined according to the region saliency matrices. A second weight $B_{vis}^2$ of the visible light luminance base layer and a second weight $B_{ir}^2$ of the infrared image base layer are determined according to a preset optimal luminance value. A fusion weight of the visible light luminance base layer is determined according to the first weight $B_{vis}^1$ of the visible light luminance base layer and the second weight $B_{vis}^2$ of the visible light luminance base layer; and a fusion weight of the infrared image base layer is determined according to the first weight $B_{ir}^1$ of the infrared image base layer and the second weight $B_{ir}^2$ of the infrared image base layer. The visible light luminance base layer and the infrared image base layer are fused according to the fusion weight of the visible light luminance base layer and the fusion weight of the infrared image base layer.

In an embodiment, the visible light luminance base layer and the infrared image base layer are fused mainly based on objective criteria such as region saliency and subjective criteria such as a better visual effect. Steps are described below.

First, the calculation of the first weight of the base layer based on the region saliency.

High-pass filtering is performed on $Y_{vis\_base}$ and $Y_{ir\_base}$ by using the Laplace operator $$L = \begin{bmatrix} 1 & 1 & 1 \\ 1 & -8 & 1 \\ 1 & 1 & 1 \end{bmatrix}$$

(other high-pass filtering methods may also be used and are not limited herein) to obtain the saliency matrices $c_{vis}$ and $C_{ir}$, and the first weight of $Y_{vis\_base}$ and the first weight of $Y_{ir\_base}$ are respectively as below.

The first weight $B_{vis}^1$ of the visible light luminance base layer is determined as that $$B_{vis}^1 = \frac{|C_{vis}|}{\max|C_{vis}|}.$$

The first weight $B_{ir}^1$ of the infrared image base layer is determined as that $$B_{ir}^1 = \frac{|C_{ir}|}{\max|C_{ir}|}.$$

Second, the calculation of the second weight of the base layer based on the better-visual-effect theory is as follows.

The second weight of $Y_{vis\_base}$ base and the second weight of $Y_{ir\_base}$ base are respectively obtained according to the following formulas:

$$B_{vis}^2 = \exp\left(-\frac{(Y_{vis\_base} - \mu_1)^2}{2\sigma_1^2}\right),$$

$$B_{ir}^2 = \exp\left(-\frac{(Y_{ir\_base} - \mu_1)^2}{2\sigma_2^2}\right).$$

$B_{vis}^2$ represents the second weight of the visible light luminance base layer, and $B_{ir}^2$ represents the second weight of the infrared image base layer. $\mu_1$ represents a preset optimal luminance value, and the value range of $\mu_1$ for an image of 8 bits is generally [100, 200]. $\sigma_1^2$ represents a preset standard deviation. It can be seen that the closer the luminance of the source image to the optimal luminance value, the larger the fusion weight. Therefore, not only the fused picture luminance is more suitable for human eyes to view, but also the color cast of the picture which may be caused by too many infrared components due to overexposed areas (such as the number plate) in the infrared image can be effectively prevented.

Third, the final fusion weights of the base layers are as follows:

$$B_{vis} = (B_{vis}^1)^{\gamma_1}(B_{vis}^2)^{\gamma_2};$$

$$B_{ir} = (B_{ir}^1)^{\gamma_1}(B_{ir}^2)^{\gamma_2};$$

$$B_{vis}' = \frac{B_{vis}}{B_{vis} + B_{ir}}; \text{ and}$$

$$B_{ir}' = 1 - B_{vis}'.$$

$r_1$ and $r_2$ represent preset control parameters and may control the contribution of the first weight and the second weight to a fusion weight of a final base layer. $B'_{vis}$ represents the fusion weight of the visible light luminance base layer, and $B'_{ir}$ represents the fusion weight of the infrared image base layer. The fused base layer satisfies following: $Y_{comb\_base} = B_{vis}'*Y_{vis\_base} + B_{ir}'*Y_{ir\_base}$. $Y_{comb\_base}$ represents the fusion result of the base layers, $Y_{vis\_base}$ represents the visible light luminance base layer, and $Y_{ir\_base}$ represents the infrared image base layer.

In this way, the better-visual-effect theory may be considered in the process of fusing the base layers, the final weights for the fusion are adjusted, and subjective factors are taken into account. Therefore, the fused image not only has the relatively high signal-to-noise ratio and clarity, but also can be more suitable for human visual senses.

In an embodiment, the step in which the visible light luminance detail layer and the infrared image detail layer are fused includes steps described below. An edge strength matrix of the visible light luminance detail layer and an edge strength matrix of the infrared image detail layer are calculated, and a first weight $D_{vis}^1$ of the visible light luminance detail layer and a first weight $D_{ir}^1$ of the infrared image detail layer are determined based on the edge strength matrices. A second weight $D_{vis}^2$ of the visible light luminance detail layer and a second weight $D_{ir}^2$ of the infrared image detail layer are determined according to a preset optimal edge strength value. A fusion weight of the visible light luminance detail layer is determined according to the first weight $D_{vis}^1$ of the visible light luminance detail layer and the second weight $D_{vis}^2$ of the visible light luminance detail layer; and a fusion weight of the infrared image detail layer is determined according to the first weight $D_{ir}^1$ of the infrared image detail layer and the second weight $D_{ir}^2$ of the infrared image detail layer. The visible light luminance detail layer and the infrared image detail layer are fused according to the fusion weight of the visible light luminance detail layer and the fusion weight of the infrared image detail layer.

Similarly, the visible light luminance detail layer and the infrared image detail layer are fused based on objective criteria such as detail strength and subjective criteria such as a better visual effect, and steps are described below.

First, low-pass filtering being performed on the visible light luminance detail layer and the infrared image detail layer respectively to obtain edge strength matrices $E_{vis}$ and $E_{ir}$.

Second, the calculation of the first weight of the detail layer based on the detail strength is as follows.

$$D_{vis}^1 = \frac{E'_{vis}}{E'_{vis} + E_{ir}}; \text{ and}$$

$$D_{ir}^1 = 1 - D_{vis}^1.$$

$$E'_{vis} = \begin{cases} 0, & \text{if } E_{vis} < th \\ E_{vis}, & \text{else} \end{cases},$$

and th represents a preset threshold. The value of the visible light edge strength less than the threshold is set to 0, so that the visible light noise can be effectively reduced. $D_{vis}^2$ represents the first weight of the visible light luminance detail layer, and $D_{ir}^2$ represents the first weight of the infrared image detail layer.

Third, the calculation of the second weight of the detail layer based on the better-visual-effect theory is as follows.

The second weight of $Y_{vis\_det}$ and the second weight of $Y_{ir\_det}$ are respectively obtained according to the following formulas:

$$D_{vis}^2 = \exp\left(-\frac{(E_{vis} - \mu_2)^2}{2\sigma_2^2}\right),$$

-continued $$D_{ir}^2 = \exp\left(-\frac{(E_{ir} - \mu_2)^2}{2\sigma_2^2}\right).$$

$\mu_2$ represents a preset optimal edge strength value, and the value range of $\mu_2$ for an image of 8 bits is generally [35, 80]. $\sigma_2^2$ represents a preset standard deviation. It can be seen that the closer the local detail strength of the source image is to an optimal strength value, the larger the fusion weight. Therefore, the excessive edge enhancement that may be caused by relying only on the detail strength weight can be effectively prevented. $D_{vis}^2$ represents the second weight of the visible light luminance detail layer, and $D_{ir}^2$ represents the second weight of the infrared image detail layer. Fourth, the final fusion weights of the base layers $$D_{vis} = (D_{vis}^1)^{r_3}(D_{vis}^2)^{r_4};$$

$$D_{ir} = (D_{ir}^1)^{r_3}(D_{ir}^2)^{r_4};$$

$$D_{vis} = \frac{D_{vis}}{D_{vis} + D_{ir}}; \text{ and}$$

$$D_{ir} = 1 - D_{vis}.$$

$r_3$ and $r_4$ are preset parameters and may control the contribution of each weight to the final detail layer fusion weights. $D_{vis}$ represents the second weight of the visible light luminance detail layer, and $D_{ir}$ represents the second weight of the infrared image detail layer. The fused detail layer satisfies following:

$$Y_{comb\_det} = D_{vis} * Y_{vis\_det} + D_{ir} * Y_{ir\_det}.$$

$Y_{comb\_det}$ represents the fusion result of the detail layers, $Y_{vis\_det}$ represents the visible light luminance detail layer, and $Y_{ir\_det}$ represents the infrared image detail layer.

Therefore, the fused luminance image satisfies that $Y_{comb} = Y_{comb\_base} + Y_{comb\_det}$. The final fused color image can be obtained by combining the fused luminance image and the chrominance component of the chrominance noise-reduced visible light image.

In step S140, image reconstruction is performed according to the luminance fusion result and the chrominance component of the visible light image to obtain a fused image. After the luminance fusion is performed on the luminance component of the visible light image and the infrared image, the image reconstruction may be performed on the fusion result and the chrominance component of the visible light image to obtain the final fused image.

Figure 2:
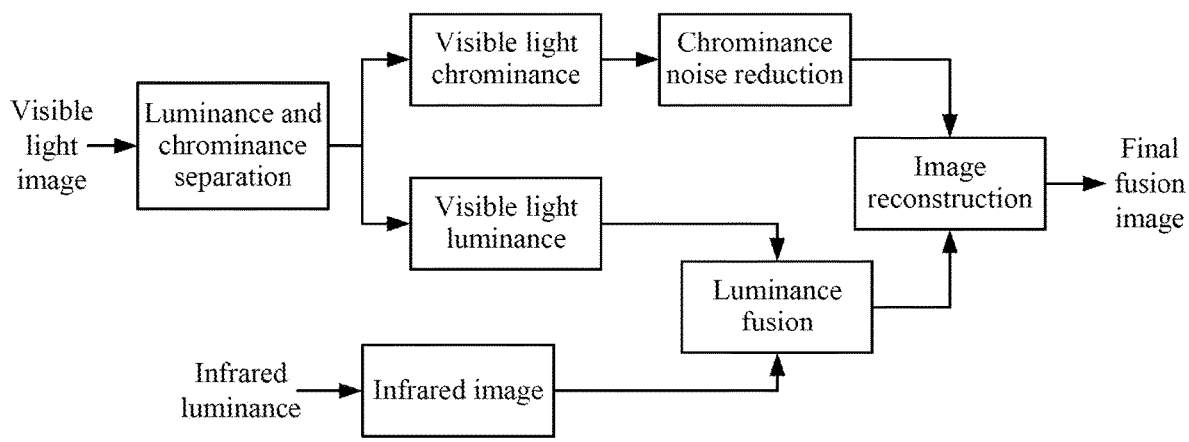
FIG. 2 is a schematic diagram of an image fusion flow according to an embodiment of the present application.

FIG. 2 is a schematic diagram of an image fusion flow according to an embodiment of the present application. As shown in FIG. 2, after a visible light image and an infrared image of a shooting target are obtained, luminance and chrominance separation processing is performed on the visible light image to obtain visible light luminance and visible light chrominance. Luminance fusion is performed on the visible light luminance and the infrared luminance of the infrared image to obtain a luminance fusion result, and chrominance noise reduction processing may be performed on the visible light chrominance. Image reconstruction is performed on the obtained noise reduction result and the luminance fusion result to obtain a final fused image. In an embodiment, the linear filtering algorithm (such as mean filtering, Gaussian filtering and the like) or non-linear edge preserving filtering algorithm (such as bilateral filtering, non-local mean filtering and the like) may be adopted to perform noise reduction on the chrominance component of the visible light image. The image after the chrominance noise reduction has a higher signal-to-noise ratio. In this way, problems can be avoided such as color distortion, edge blurring and pseudo-edge caused by the inconsistency in the luminance and the structure due to direct fusion of the infrared image and the visible light image. Moreover, the excessive picture enhancement caused by that fusion rules only consider objective factors can be avoided, so that the fused image is more suitable for human eyes to view.

In the embodiment, the visible light luminance has the same meaning as the luminance component of the visible light image, and the visible light chrominance has the same meaning as the chrominance component of the visible light image.

Figure 3:
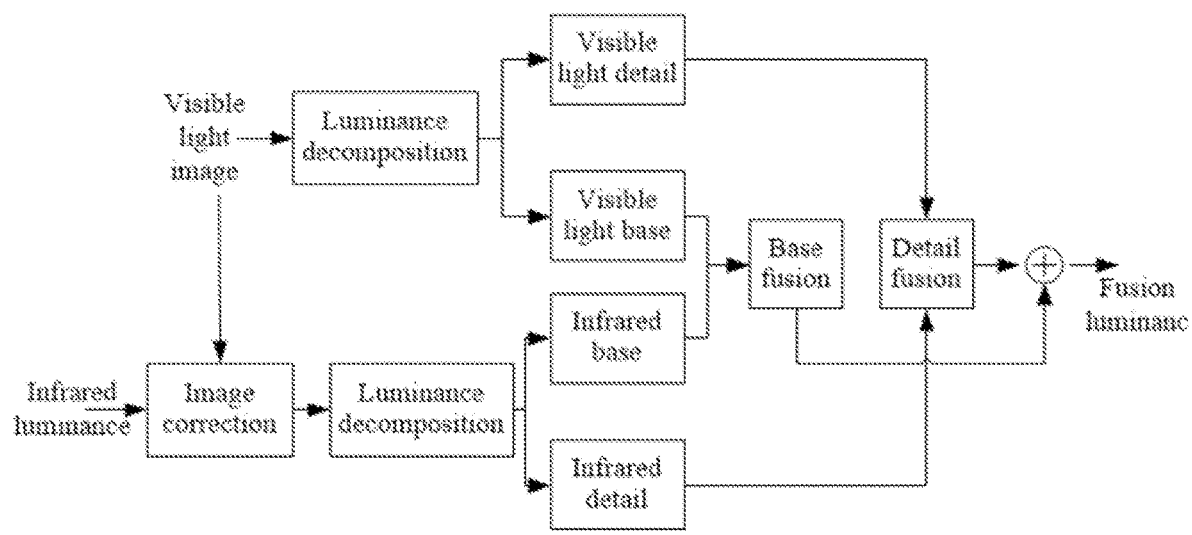
FIG. 3 is a schematic diagram of a luminance fusion flow according to an embodiment of the present application.

FIG. 3 is a schematic diagram of a luminance fusion flow according to an embodiment of the present application. As shown in FIG. 3, after infrared luminance of an infrared image and visible light luminance of a visible light image are obtained, image correction may be first performed on the infrared luminance by using the visible light luminance, and luminance decomposition is performed on the visible light luminance and the corrected infrared image to obtain a visible light detail layer, a visible light base layer, an infrared detail layer and an infrared base layer, respectively. One of the above manners may be adopted to fuse the visible light base layer and the infrared base layer and to perform detail fusion on the visible light detail layer and the infrared detail layer. Moreover, the result of the fusion of the base layers and the result of the fusion of the detail layers are finally fused to obtain the final fused luminance.

In the embodiment, the visible light detail layer has the same meaning as the visible light luminance detail layer, the visible light base layer has the same meaning as the visible light luminance base layer, the infrared detail layer has the same meaning as the infrared image detail layer, and the infrared base layer has the same meaning as the infrared image base layer.

In an embodiment, the inconsistency in the luminance and the structure of the source image is eliminated, so that color cast, detail loss, pseudo-edge and other problems that may be caused in the fusion techniques in the related art are avoided. In addition, during the fusion, not only objective factors such as region saliency and edge strength are taken into account, but also subjective perception of human eyes of the image is considered, which effectively solve the problem of excessive enhancement of the fused image and make the visual effect of the fused image more natural.

In the embodiment of the present embodiment, a visible light image and an infrared image which are to-be-fused are acquired. Luminance and chrominance separation is performed on the visible light image to extract a luminance component and a chrominance component. Luminance fusion is performed on the luminance component of the visible light image and the infrared image to obtain a luminance fusion result. Image reconstruction is performed according to the luminance fusion result and the chrominance component of the visible light image to obtain a fused image. According to the embodiment provided by the present application, the luminance fusion is performed on the luminance component of the visible light image and the luminance component of the infrared image, so that the signal-to-noise ratio and the contrast of the image obtained after fusion are improved, and edge information is better retained.

Figure 4:
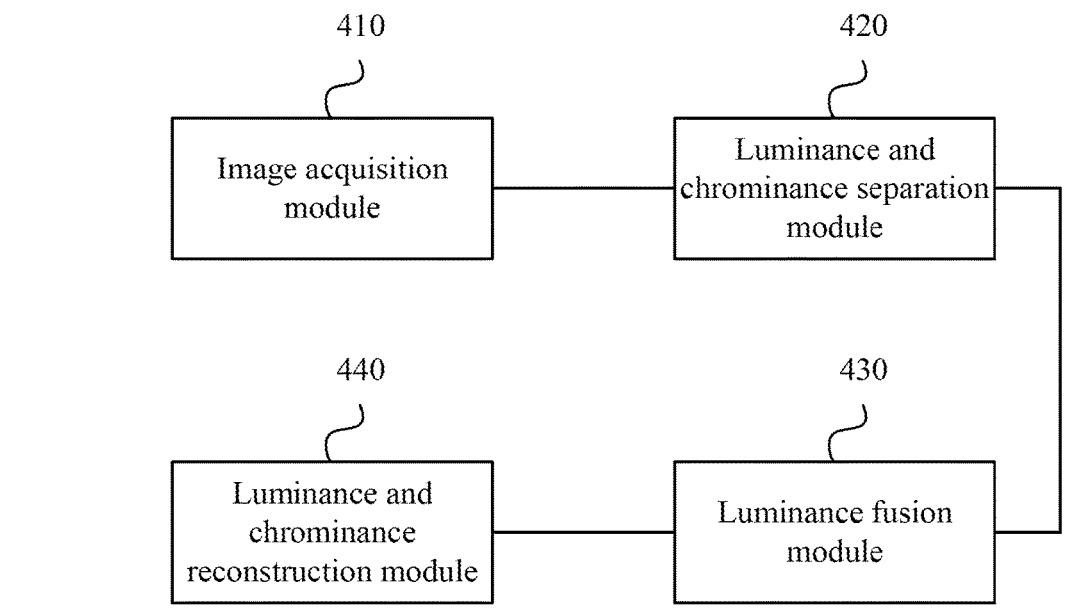
FIG. 4 is a structural diagram of an image fusion apparatus according to an embodiment of the present application.

FIG. 4 is a structural diagram of an image fusion apparatus according to an embodiment of the present application.

As shown in FIG. 4, the image fusion apparatus includes an image acquisition module 410, a luminance and chrominance separation module 420, a luminance fusion module 430 and a luminance and chrominance reconstruction module 440. The image acquisition module 410 is configured to acquire a visible light image and an infrared image which are to-be-fused. The luminance and chrominance separation module 420 is configured to perform luminance and chrominance separation on the visible light image to extract a luminance component and a chrominance component. The luminance fusion module 430 is configured to perform luminance fusion on the luminance component of the visible light image and the infrared image to obtain a luminance fusion result. The luminance and chrominance reconstruction module 440 is configured to perform image reconstruction according to the luminance fusion result and the chrominance component of the visible light image to obtain a fused image.

In the embodiment of the present embodiment, a visible light image and an infrared image which are to-be-fused are acquired. Luminance and chrominance separation is performed on the visible light image to extract a luminance component and a chrominance component. Luminance fusion is performed on the luminance component of the visible light image and the infrared image to obtain a luminance fusion result. Image reconstruction is performed according to the luminance fusion result and the chrominance component of the visible light image to obtain a fused image. According to the embodiment provided by the present application, the luminance fusion is performed on the luminance component of the visible light image and the luminance component of the infrared image, so that the signal-to-noise ratio and the contrast of the image obtained after fusion are improved, and edge information is better retained.

The above products may execute the method provided by any embodiment of the present application, and has functional modules corresponding to the executed method.

The embodiment of the present application further provides a non-transitory storage medium including computer-executable instructions which, when executed by a computer processor, execute an image fusion method. The method includes steps described below. A visible light image and an infrared image which are to-be-fused are acquired. Luminance and chrominance separation is performed on the visible light image to extract a luminance component and a chrominance component. Luminance fusion is performed on the luminance component of the visible light image and the infrared image to obtain a luminance fusion result. Image reconstruction is performed according to the luminance fusion result and the chrominance component of the visible light image to obtain a fused image.

The non-transitory storage medium is any one of various types of memory devices or storage devices. The term "storage medium" is intended to include: an installation medium such as a compact disc read-only memory (CD-ROM), a floppy disk or a magnetic tape device; a computer system memory or a random-access memory such as a dynamic random-access memory (DRAM), a double data rate random-access memory (DDR RAM), a static random-access memory (SRAM), an extended data out random-access memory (EDO RAM) and a Rambus random-access memory (Rambus RAM); a non-volatile memory such as a flash memory and a magnetic medium (like a hard disk or an optical storage); a register or other similar types of memory components, etc. The non-transitory storage medium may further include other types of memories or combinations thereof. In addition, the non-transitory storage medium may be located in a computer system in which programs are executed, or may be located in a different second computer system connected to the computer system through a network (such as the Internet). The second computer system may provide program instructions to a computer for execution. The term "storage medium" may include two or more storage media which may reside at different positions (for example, in different computer systems connected through a network). The non-transitory storage medium may store program instructions (for example, embodied as computer programs) which are executable by one or more processors.

Of course, in the non-transitory storage medium including computer-executable instructions provided by the embodiment of the present application, the computer-executable instructions may implement not only the above image fusion operations but also related operations in the image fusion method provided by any embodiment of the present application.

Figure 5:
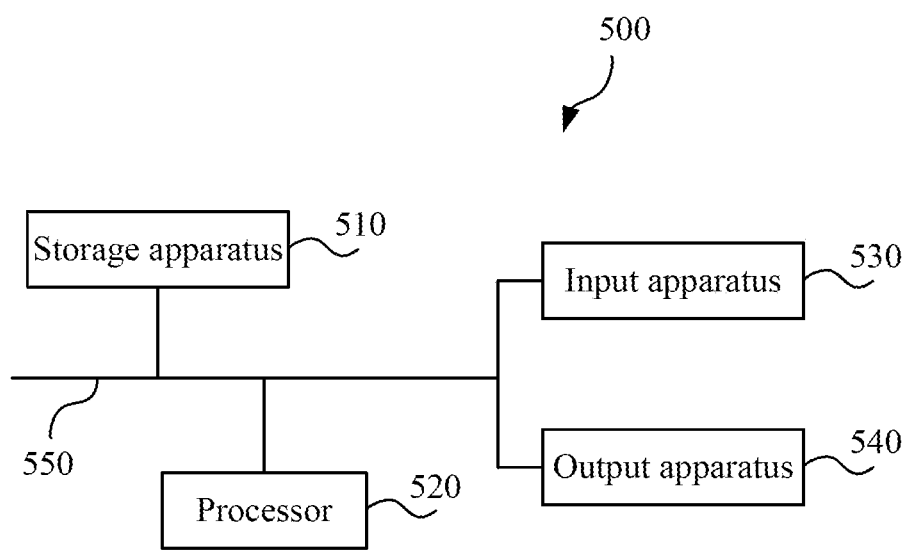
FIG. 5 is a structural diagram of an electronic device according to an embodiment of the present application.

The embodiment of the present application provides an electronic device in which the image fusion apparatus provided by the embodiment of the present application may be integrated. FIG. 5 is a structural diagram of an electronic device according to an embodiment of the present application. As shown in FIG. 5, the embodiment provides an electronic device 500. The electronic device 500 includes one or more processors 520 and a storage apparatus 510 configured to store one or more programs which, when executed by the one or more processors 520, cause the one or more processors 520 to implement the image fusion method provided by the embodiments of the present application. The method includes steps described below. A visible light image and an infrared image which are to-be-fused are acquired. Luminance and chrominance separation is performed on the visible light image to extract a luminance component and a chrominance component. Luminance fusion is performed on the luminance component of the visible light image and the infrared image to obtain a luminance fusion result. Image reconstruction is performed according to the luminance fusion result and the chrominance component of the visible light image to obtain a fused image.

Of course, the processor 520 also implements the image fusion method provided by any embodiment of the present application.

The electronic device 500 shown in FIG. 5 is merely an example and is not intended to limit the function and use scope of the embodiments of the present application.

As shown in FIG. 5, the electronic device 500 includes a processor 520, a storage apparatus 510, an input apparatus 530 and an output apparatus 540. One or more processors 520 may be disposed in the electronic device, and one processor 520 is taken as an example in FIG. 5. The processor 520, the storage apparatus 510, the input apparatus 530 and the output apparatus 540 in the electronic device may be connected through a bus or in other manners. FIG. 5 uses connection through a bus as an example.

As a computer-readable storage medium, the storage apparatus 510 may be configured to store software programs, computer-executable programs and module units, such as program instructions corresponding to the image fusion method in the embodiments of the present application.

The storage apparatus 510 may mainly include a program storage area and a data storage area. The program storage area may store an operating system and an application program required for implementing at least one function while the data storage area may store data created depending on use of terminals. In addition, the storage apparatus 510 may include a high-speed random-access memory, and may also include a non-volatile memory, such as at least one disk memory, flash memory or another non-volatile solid-state memory. In some examples, the storage apparatus 510 may further include memories disposed remotely relative to the processor 520, and these remote memories may be connected through a network. Examples of the above network include, but are not limited to, the Internet, an intranet, a local area network, a mobile communication network and a combination thereof.

The input apparatus 530 may be configured to receive input digital, character or speech information and generate key signal input related to user settings and function control of the electronic device. The output apparatus 540 may include devices such as a display screen and a speaker.

According to the electronic device provided by the embodiment of the present application, the luminance fusion may be performed on the luminance component of the visible light image and the luminance component of the infrared image, so that the signal-to-noise ratio and the contrast of the image obtained after fusion are improved, and edge information is better retained.

The image fusion apparatus, medium and electronic device provided by the above embodiments may execute the image fusion method provided by any embodiment of the present application, and have corresponding functional modules for executing the method. For technical details not described in the above embodiments, reference may be made to the image fusion method provided by any embodiment of the present application.

What is claimed is:

1. An image fusion method, comprising:
    acquiring a visible light image and an infrared image which are to-be-fused;
    performing luminance and chrominance separation on the visible light image to extract a luminance component of the visible light image and a chrominance component of the visible light image;
    performing luminance fusion on the luminance component of the visible light image and the infrared image to obtain a luminance fusion result; and
    performing image reconstruction according to the luminance fusion result and the chrominance component of the visible light image to obtain a fused image,
    wherein performing the luminance fusion on the luminance component of the visible light image and the infrared image to obtain the luminance fusion result comprises:
    correcting the infrared image according to the luminance component of the visible light image to obtain a corrected infrared image;
    performing image layer decomposition on the luminance component of the visible light image and the corrected infrared image, respectively, and performing corresponding fusion on a plurality of layers of the luminance component of the visible light image obtained after the image layer decomposition and a plurality of layers of the corrected infrared image obtained after the image layer decomposition; and
    superimposing results of performing corresponding fusion on the plurality of layers of the luminance component of the visible light image obtained after the image layer decomposition and the plurality of layers of the corrected infrared image obtained after the image layer decomposition to obtain the luminance fusion result.

2. The method according to claim 1, wherein correcting the infrared image according to the luminance component of the visible light image to obtain the corrected infrared image comprises:

determining a position of a reference pixel in the luminance component of the visible light image according to a position of each pixel in the infrared image; and determining a luminance correction result of the each pixel according to a preset-range neighborhood block with the position of the reference pixel as a center and a preset-range neighborhood block with the position of the each pixel as a center to obtain the corrected infrared image.

3. The method according to claim 2, wherein determining the luminance correction result of the each pixel according to the preset-range neighborhood block with the position of the reference pixel as the center and the preset-range neighborhood block with the position of the each pixel as the center comprises:

determining the luminance correction result of the each pixel by adopting the following formula:

$$Y_{ir}'(i)=Y_{vis}(i)\alpha_i(1)+\alpha_i(2);$$

wherein $Y_{ir}'(i)$ represents the luminance correction result of the each pixel, $Y_{vis}(i)$ represents a luminance value of the reference pixel, and $\alpha_i(1)$ and $\alpha_i(2)$ represent a first numerical value of a matrix $\alpha_i$ and a second numerical value of the matrix $\alpha_i$;

wherein $\alpha_i=(Q_i^T W_i Q_i+\lambda I)^{-1}(Q_i^T W_i p_i+\lambda \alpha_i^0)$, $\alpha_i \Pi R^{2\times 1}$;

wherein $\lambda$ represents a preset regularization parameter, $W_i$ represents a preset weight matrix, and $Q_i$ represents a matrix formed by luminance values of a plurality of pixels within the preset-range neighborhood block with the position of the each pixel as the center and a numerical value 1; $Q_i^T$ represents a transposed matrix of $Q_i$; $p_i$ represents a matrix formed by luminance values of pixels within the preset-range neighborhood block with the position of the reference pixel as the center; I represents an identity matrix; $\alpha_i^0$ represents a local contrast factor formed by a ratio of a luminance value of the each pixel to an average value of the luminance values of the plurality of pixels within the preset-range neighborhood block with the position of the each pixel as the center; and $R^{2\times 1}$ represents a linear space formed by all 2×1 matrices over a real number field R.

4. The method according to claim 1, wherein performing the image layer decomposition on the luminance component of the visible light image and the corrected infrared image, respectively, and performing the corresponding fusion on the plurality of layers of the luminance component of the visible light image obtained after the image layer decomposition and on the plurality of layers of the corrected infrared image obtained after the image layer decomposition comprises:

performing decomposition to the luminance component of the visible light image into a visible light luminance base layer and a visible light luminance detail layer, and performing decomposition to the corrected infrared image into an infrared image base layer and an infrared image detail layer; and fusing the visible light luminance base layer and the infrared image base layer, and fusing the visible light luminance detail layer and the infrared image detail layer.

5. The method according to claim 4, wherein fusing the visible light luminance base layer and the infrared image base layer comprises:

determining a region saliency matrix of the visible light luminance base layer and a region saliency matrix of the infrared image base layer through high-pass filtering, and determining a first weight $B_{vis}^1$ of the visible light luminance base layer and a first weight $B_{ir}^1$ of the infrared image base layer according to the region saliency matrix of the visible light luminance base layer and the region saliency matrix of the infrared image base layer;

determining a second weight $B_{vis}^2$ of the visible light luminance base layer and a second weight $B_{ir}^2$ of the infrared image base layer according to a preset optimal luminance value;

determining a fusion weight of the visible light luminance base layer according to the first weight $B_{vis}^1$ of the visible light luminance base layer and the second weight $B_{vis}^2$ of the visible light luminance base layer; and determining a fusion weight of the infrared image base layer according to the first weight $B_{ir}^1$ of the infrared image base layer and the second weight $B_{ir}^2$ of the infrared image base layer; and fusing the visible light luminance base layer and the infrared image base layer according to the fusion weight of the visible light luminance base layer and the fusion weight of the infrared image base layer.

6. The method according to claim 4, wherein fusing the visible light luminance detail layer and the infrared image detail layer comprises:

calculating an edge strength matrix of the visible light luminance detail layer and an edge strength matrix of the infrared image detail layer, and determining a first weight $D_{vis}^1$ of the visible light luminance detail layer and a first weight $D_{ir}^1$ of the infrared image detail layer based on an edge strength matrix of the visible light luminance detail layer and an edge strength matrix of the infrared image detail layer;

determining a second weight $D_{vis}^2$ of the visible light luminance detail layer and a second weight $D_{ir}^2$ of the infrared image detail layer according to a preset optimal edge strength value;

determining a fusion weight of the visible light luminance detail layer according to the first weight $D_{vis}^1$ of the visible light luminance detail layer and the second weight $D_{vis}^2$ of the visible light luminance detail layer; and determining a fusion weight of the infrared image detail layer according to the first weight $D_{ir}^1$ of the infrared image detail layer and the second weight $D_{ir}^2$ of the infrared image detail layer; and fusing the visible light luminance detail layer and the infrared image detail layer according to the fusion weight of the visible light luminance detail layer and the fusion weight of the infrared image detail layer.

7. A non-transitory computer-readable storage medium, storing a computer program, wherein the computer program, when executed by a processor, implements:

acquiring a visible light image and an infrared image which are to-be-fused;

performing luminance and chrominance separation on the visible light image to extract a luminance component of the visible light image and a chrominance component of the visible light image;

performing luminance fusion on the luminance component of the visible light image and the infrared image to obtain a luminance fusion result; and performing image reconstruction according to the luminance fusion result and the chrominance component of the visible light image to obtain a fused image, wherein performing the luminance fusion on the luminance component of the visible light image and the infrared image to obtain the luminance fusion result comprises:

correcting the infrared image according to the luminance component of the visible light image to obtain a corrected infrared image;

performing image layer decomposition on the luminance component of the visible light image and the corrected infrared image, respectively, and performing corresponding fusion on a plurality of layers of the luminance component of the visible light image obtained after the image layer decomposition and a plurality of layers of the corrected infrared image obtained after the image layer decomposition; and superimposing results of performing corresponding fusion on the plurality of layers of the luminance component of the visible light image obtained after the image layer decomposition and the plurality of layers of the corrected infrared image obtained after the image layer decomposition to obtain the luminance fusion result.

8. The non-transitory computer-readable storage medium according to claim 7, wherein the computer program, when executed by a processor, implements:

determining a position of a reference pixel in the luminance component of the visible light image according to a position of each pixel in the infrared image; and determining a luminance correction result of the each pixel according to a preset-range neighborhood block with the position of the reference pixel as a center and a preset-range neighborhood block with the position of the each pixel as a center to obtain the corrected infrared image.

9. The non-transitory computer-readable storage medium according to claim 8, wherein the computer program, when executed by a processor, implements:

determining the luminance correction result of the each pixel by adopting the following formula:

$$Y_{ir}'(i)=Y_{vis}(i)\alpha_i(1)+\alpha_i(2);$$

wherein $Y_{ir}'(i)$ represents the luminance correction result of the each pixel, $Y_{vis}(i)$ represents a luminance value of the reference pixel, and $\alpha_i(1)$ and $\alpha_i(2)$ represent a first numerical value of a matrix $\alpha_i$ and a second numerical value of the matrix $\alpha_i$;

wherein $\alpha_i=(Q_i^T W_i Q_i+\lambda I)^{-1}(Q_i^T W_i p_i+\lambda \alpha_i^0)$, $\alpha_i \Pi R^{2 \times 1}$;

wherein $\lambda$ represents a preset regularization parameter, $W_i$ represents a preset weight matrix, and $Q_i$ represents a matrix formed by luminance values of a plurality of pixels within the preset-range neighborhood block with the position of the each pixel as the center and a numerical value 1; $Q_i^T$ represents a transposed matrix of $Q_i$; $p_i$ represents a matrix formed by luminance values of pixels within the preset-range neighborhood block with the position of the reference pixel as the center; I represents an identity matrix; $\alpha_i^0$ represents a local contrast factor formed by a ratio of a luminance value of the each pixel to an average value of the luminance values of the plurality of pixels within the preset-range neighborhood block with the position of the each pixel as the center; and $R^{2 \times 1}$ represents a linear space formed by all 2×1 matrices over a real number field R.

10. The non-transitory computer-readable storage medium according to claim 7, wherein the computer program, when executed by a processor, implements:

performing decomposition to the luminance component of the visible light image into a visible light luminance base layer and a visible light luminance detail layer, and performing decomposition to the corrected infrared image into an infrared image base layer and an infrared image detail layer; and fusing the visible light luminance base layer and the infrared image base layer, and fusing the visible light luminance detail layer and the infrared image detail layer.

11. The non-transitory computer-readable storage medium according to claim 10, wherein the computer program, when executed by a processor, implements:

determining a region saliency matrix of the visible light luminance base layer and a region saliency matrix of the infrared image base layer through high-pass filtering, and determining a first weight $B_{vis}^1$ of the visible light luminance base layer and a first weight $B_{ir}^1$ of the infrared image base layer according to the region saliency matrix of the visible light luminance base layer and the region saliency matrix of the infrared image base layer;

determining a second weight $B_{vis}^2$ of the visible light luminance base layer and a second weight $B_{ir}^2$ of the infrared image base layer according to a preset optimal luminance value;

determining a fusion weight of the visible light luminance base layer according to the first weight $B_{vis}^1$ of the visible light luminance base layer and the second weight $B_{vis}^2$ of the visible light luminance base layer; and determining a fusion weight of the infrared image base layer according to the first weight $B_{ir}^1$ of the infrared image base layer and the second weight $B_{ir}^2$ of the infrared image base layer; and fusing the visible light luminance base layer and the infrared image base layer according to the fusion weight of the visible light luminance base layer and the fusion weight of the infrared image base layer.

12. An electronic device, comprising a memory, a processor and a computer program stored in the memory and executable by the processor, wherein the processor, when executing the computer program, implements:

acquiring a visible light image and an infrared image which are to-be-fused;

performing luminance and chrominance separation on the visible light image to extract a luminance component of the visible light image and a chrominance component of the visible light image;

performing luminance fusion on the luminance component of the visible light image and the infrared image to obtain a luminance fusion result; and performing image reconstruction according to the luminance fusion result and the chrominance component of the visible light image to obtain a fused image, wherein performing the luminance fusion on the luminance component of the visible light image and the infrared image to obtain the luminance fusion result comprises:

correcting the infrared image according to the luminance component of the visible light image to obtain a corrected infrared image;

performing image layer decomposition on the luminance component of the visible light image and the corrected infrared image, respectively, and performing corresponding fusion on a plurality of layers of the luminance component of the visible light image obtained after the image layer decomposition and a plurality of layers of the corrected infrared image obtained after the image layer decomposition; and superimposing results of performing corresponding fusion on the plurality of layers of the luminance component of the visible light image obtained after the image layer decomposition and the plurality of layers of the corrected infrared image obtained after the image layer decomposition to obtain the luminance fusion result.

13. The electronic device according to claim 12, wherein the processor, when executing the computer program, implements:

determining a position of a reference pixel in the luminance component of the visible light image according to a position of each pixel in the infrared image; and determining a luminance correction result of the each pixel according to a preset-range neighborhood block with the position of the reference pixel as a center and a preset-range neighborhood block with the position of the each pixel as a center to obtain the corrected infrared image.

14. The electronic device according to claim 13, wherein the processor, when executing the computer program, implements:

determining the luminance correction result of the each pixel by adopting the following formula:

$Y_{ir}'(i)=Y_{vis}(i)\alpha_i(1)+\alpha_i(2)$;

wherein $Y_{ir}'(i)$ represents the luminance correction result of the each pixel, $Y_{vis}(i)$ represents a luminance value of the reference pixel, and $\alpha_i(1)$ and $\alpha_i(2)$ represent a first numerical value of a matrix $\alpha_i$ and a second numerical value of the matrix $\alpha_i$;

wherein $\alpha_i=(Q_i^T W_i Q_i+\lambda I)^{-1}(Q_i^T W_i p_i+\lambda \alpha_i^0)$, $\alpha_i \Pi R^{2\times 1}$;

wherein $\lambda$ represents a preset regularization parameter, $W_i$ represents a preset weight matrix, and $Q_i$ represents a matrix formed by luminance values of a plurality of pixels within the preset-range neighborhood block with the position of the each pixel as the center and a numerical value 1; $Q_i^T$ represents a transposed matrix of $Q_i$; $p_i$ represents a matrix formed by luminance values of pixels within the preset-range neighborhood block with the position of the reference pixel as the center; I represents an identity matrix; $\alpha_i^0$ represents a local contrast factor formed by a ratio of a luminance value of the each pixel to an average value of the luminance values of the plurality of pixels within the preset-range neighborhood block with the position of the each pixel as the center; and $R^{2\times 1}$ represents a linear space formed by all 2×1 matrices over a real number field R.

15. The electronic device according to claim 12, wherein the processor, when executing the computer program, implements:

performing decomposition to the luminance component of the visible light image into a visible light luminance base layer and a visible light luminance detail layer, and performing decomposition to the corrected infrared image into an infrared image base layer and an infrared image detail layer; and fusing the visible light luminance base layer and the infrared image base layer, and fusing the visible light luminance detail layer and the infrared image detail layer.

16. The electronic device according to claim 15, wherein the processor, when executing the computer program, implements:

determining a region saliency matrix of the visible light luminance base layer and a region saliency matrix of the infrared image base layer through high-pass filtering, and determining a first weight $B_{vis}^1$ of the visible light luminance base layer and a first weight $B_{ir}^1$ of the infrared image base layer according to the region saliency matrix of the visible light luminance base layer and the region saliency matrix of the infrared image base layer;

determining a second weight $B_{vis}^2$ of the visible light luminance base layer and a second weight $B_{ir}^2$ of the infrared image base layer according to a preset optimal luminance value;

determining a fusion weight of the visible light luminance base layer according to the first weight $B_{vis}^1$ of the visible light luminance base layer and the second weight $B_{vis}^2$ of the visible light luminance base layer; and determining a fusion weight of the infrared image base layer according to the first weight $B_{ir}^1$ of the infrared image base layer and the second weight $B_{ir}^2$ of the infrared image base layer; and fusing the visible light luminance base layer and the infrared image base layer according to the fusion weight of the visible light luminance base layer and the fusion weight of the infrared image base layer.

17. The electronic device according to claim 15, wherein the processor, when executing the computer program, implements:

calculating an edge strength matrix of the visible light luminance detail layer and an edge strength matrix of the infrared image detail layer, and determining a first weight $D_{vis}^1$ of the visible light luminance detail layer and a first weight $D_{ir}^1$ of the infrared image detail layer based on an edge strength matrix of the visible light luminance detail layer and an edge strength matrix of the infrared image detail layer;

determining a second weight $D_{vis}^2$ of the visible light luminance detail layer and a second weight $D_{ir}^2$ of the infrared image detail layer according to a preset optimal edge strength value;

determining a fusion weight of the visible light luminance detail layer according to the first weight $D_{vis}^1$ of the visible light luminance detail layer and the second weight $D_{vis}^2$ of the visible light luminance detail layer; and determining a fusion weight of the infrared image detail layer according to the first weight $D_{ir}^1$ of the infrared image detail layer and the second weight $D_{ir}^2$ of the infrared image detail layer; and fusing the visible light luminance detail layer and the infrared image detail layer according to the fusion weight of the visible light luminance detail layer and the fusion weight of the infrared image detail layer.

* * * * *